UNITED STATES PATENT OFFICE.

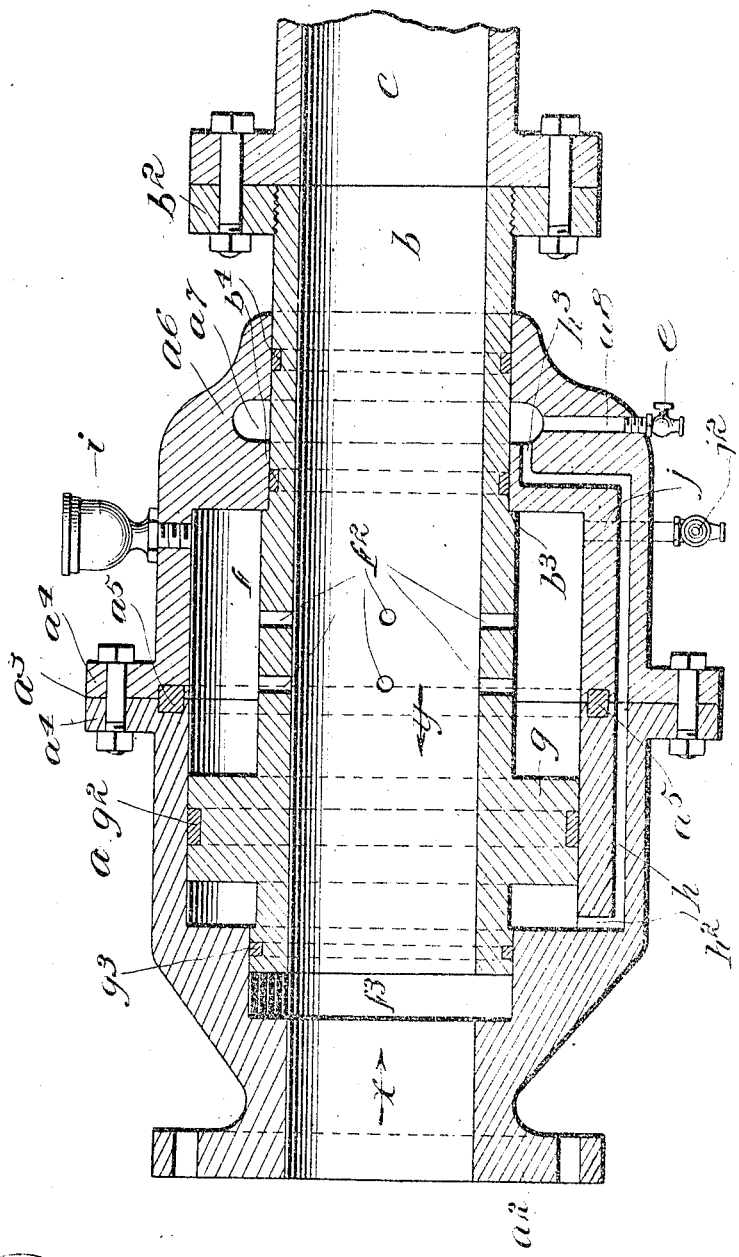

JULIUS E. STRUER, OF BROOKLYN, NEW YORK.

SLIP-JOINT FOR STEAM-PIPES.

943,904.

Specification of Letters Patent.

Patented Dec. 21, 1909.

Application filed March 11, 1909. Serial No. 482,853.

*To all whom it may concern:*

Be it known that I, JULIUS E. STRUER, a citizen of the United States, and residing at Brooklyn, in the county of Kings and State of New York, have invented certain new and useful Improvements in Slip-Joints for Steam-Pipes, of which the following is a specification, such as will enable those skilled in the art to which it appertains to make and use the same.

This invention relates to slip joints for steam pipe couplings; and the object thereof is to provide an improved device of this class particularly designed to be used in connection with high pressure steam apparatus, and in which the longitudinal movement of the longitudinally movable member of the joint or coupling is controlled or regulated by steam pressure in said joint or coupling operating in the direction of the boiler and to move said longitudinally movable member of the joint or coupling of the boiler, and to prevent too great and sudden movement of said parts in the opposite direction, and thus avoid the structural shocks or jars in the steam pipe connected with said joint or coupling and in the various joints or connections of said steam pipe and in the joints or connections of the couplings thereof; and with these and other objects in view the invention consists in a slip joint or coupling for steam pipes constructed as hereinafter described and claimed.

The invention is fully disclosed in the following specification, of which the accompanying drawing forms a part, in which the separate parts of my improvement are designated by suitable reference characters, said drawing being a longitudinal sectional view of my improved slip joint coupling.

My invention comprises a main outer casing $a$ and a pipe $b$, one end of which is passed into one end of the casing $a$, and the opposite end of the casing $a$ is provided with a flange $a^2$ by means of which it may be secured to the casing of a boiler or to a pipe connected therewith, which in turn is connected with the boiler, and the outer end of the pipe $b$ is provided with a flange $b^2$ which is preferably formed separately and connected therewith by a screw thread or otherwise, and by means of which it may be connected with a steam pipe $c$ by which steam is conveyed to an engine or other power device directly or indirectly by means of other pipes and couplings connected therewith.

The casing is divided at $a^3$ into two parts having flanges $a^4$ by which they are bolted or otherwise secured together, and between which is placed a packing ring $a^5$, and the end of the casing $a$ opposite the boiler end thereof is provided with a neck $a^6$, in the inner wall of which is formed a deep annular groove $a^7$ provided with a discharge outlet $a^8$, with which is preferably connected a pet-cock coupling device $e$ with which may be connected a discharge pipe.

The main outer casing $a$ is enlarged to form an annular chamber $f$ which is placed in communication with the pipe $b$ by radial ports or passages $f^2$ formed in said pipe, and the pipe $b$ where it passes through the main outer casing $a$ or through the chamber $f$ is provided with an annular collar $g$ which forms a piston which closely fits and is movable in the said chamber, and is provided with a packing ring $g^2$, and the inner end of the pipe $b$ which is movable in a supplemental annular chamber $f^3$ forming an extension of the chamber $f$ is also provided with a packing ring $g^3$.

The pipe $b$ is also provided with an annular shoulder $b^3$ which limits the outward movement thereof, and said pipe is also provided where it passes through the neck $a^6$ of the casing $a$ with packing rings $b^4$ arranged on the opposite sides of the annular groove $a^7$ in the said neck $a^6$ of the casing $a$.

Formed in one side of the casing $a$, longitudinally thereof, is a passage $h$ which communicates at one end with the inner end of the annular chamber $f$ by a radial flange $h^2$, and the other end of which communicates with the annular groove $a^7$ as shown at $h^3$.

The parts of my improved coupling are assembled by first inserting the pipe $b$ into the left end portion of the main outer casing $a$, then passing the right end portion of said main outer casing into position over said pipe and securing said parts together, after which the flange $b^2$ may be secured to said pipe. The main outer casing is also provided with a lubricating cup $i$ through which the walls of the chamber $f$ and the piston $g$ may be lubricated, and the operation will be readily understood from the foregoing description when taken in connection with the accompanying drawing and the following statement thereof.

If high pressure steam be passing through the coupling from the boiler or in the direction of the arrow $x$ the steam will also pass through the ports or passages $f^2$ into the annular chamber $f$ and will operate on the piston $g$ to hold the pipe $b$ in its normal position or prevent its outward movement. If high pressure steam is passing through a coupling of this class under ordinary conditions there is frequently a great strain on the steam pipe $c$ and its connections, not shown, especially if said connections contain or involve elbow or other angular joints, and the quick movement of the pipe $b$ serves to disturb or break such joints and also to injure the parts of the coupling or the connections thereof. With my improvement, however, the steam in the chamber $f$ operates to force the pipe $b$ toward the boiler or in the direction of the arrow $y$ and to prevent said pipes from too great movement or sudden movement in the direction of the arrow $x$, but the construction and arrangement of my improved coupling is such as to permit of the usual or ordinary expansion and contraction of the parts thereof without injury thereto or to the connections of the pipe $b$.

The transverse dimensions of the annular chamber $f$ are preferably equal to the transverse inner dimensions of the pipe $b$, and this as will be understood, operates to equalize the pressure in said pipe, and said chamber and the pipe $b$ is as apt to move in the direction of the arrow $y$ as in that of the arrow $x$. It will be understood, however, that the pressure operating to hold the pipe $b$ or to force it in the direction of the arrow $y$ will depend upon the dimensions of the chamber $f$, and these dimensions may be regulated if desired. Any water of condensation that may collect in the end of the chamber $f$ adjacent to the boiler will pass through the passage $h$ and into the annular chamber or groove $a^7$ and may be drawn off, as will be readily understood, through the outlet at $a^8$, and any water of condensation that collects in the outer or opposite end of said chamber may be drawn off through a passage $j$ which communicates therewith and is provided with a pet-cock coupling $j^2$ similar to the passage $a^8$ and pet-cock coupling $e$.

Although I have described my improvement as a slip joint coupling for steam pipes, it will be apparent that the same may be used whenever devices of this class are required and in connection with any kind or class of liquid or fluid pipes.

Having fully described my invention, what I claim as new and desire to secure by Letters Patent, is:—

1. In a slip joint for pipes, a main outer casing provided at one end with a neck and at the opposite end with an attaching flange, said casing being divided centrally into two detachably connected parts, a pipe passing into the neck end of said casing and movable longitudinally therein, said casing being also provided with an annular piston chamber through which said pipe passes, and said pipe being provided with an annular member forming a piston movable in said chamber, the neck of the casing being also provided with a deep annular groove around said pipe, the main casing being also provided in one side thereof with a longitudinal passage which communicates at one end with said annular groove and at the opposite end with the piston chamber, said annular groove and the end of the piston chamber adjacent thereto being provided with discharge passages or ports.

2. In a slip joint for pipes, a main outer casing provided at one end with a neck and at the opposite end with an attaching flange, said casing being divided centrally into two detachably connected parts, a pipe passing into the neck end of said casing and movable longitudinally therein, said casing being also provided with an annular piston chamber through which said pipe passes, and said pipe being provided with an annular member forming a piston movable in said chamber, the neck of the casing being also provided with a deep annular groove around said pipe, the main casing being also provided in one side thereof with a longitudinal passage which communicates at one end with said annular groove and at the opposite end with the piston chamber, said annular groove and the end of the piston chamber adjacent thereto being provided with discharge passages or ports, and said pipe being provided with means for limiting the outward movement thereof.

In testimony that I claim the foregoing as my invention I have signed my name in presence of the subscribing witnesses this 9th day of March 1909.

JULIUS E. STRUER.

Witnesses:
C. E. MULREANY,
H. R. CANFIELD.